(12) United States Patent
Belmonte et al.

(10) Patent No.: US 8,864,470 B2
(45) Date of Patent: Oct. 21, 2014

(54) UNDUCTED PROPELLER WITH VARIABLE PITCH BLADES FOR A TURBOMACHINE

(75) Inventors: Olivier Belmonte, Perthes en Gatinais (FR); Franck Emmanuel Bosco, Sainte Genevieve des Bois (FR)

(73) Assignee: SNECMA, Paris (FR)

( * ) Notice: Subject to any disclaimer, the term of this patent is extended or adjusted under 35 U.S.C. 154(b) by 539 days.

(21) Appl. No.: 13/320,438

(22) PCT Filed: May 11, 2010

(86) PCT No.: PCT/FR2010/000361
§ 371 (c)(1),
(2), (4) Date: Dec. 14, 2011

(87) PCT Pub. No.: WO2010/130893
PCT Pub. Date: Nov. 18, 2010

(65) Prior Publication Data
US 2012/0093652 A1    Apr. 19, 2012

(30) Foreign Application Priority Data
May 15, 2009    (FR) .................................... 09 02361

(51) Int. Cl.
| | |
|---|---|
| B64C 11/40 | (2006.01) |
| B64C 11/30 | (2006.01) |
| B64C 11/48 | (2006.01) |
| F02C 6/20 | (2006.01) |
| F04D 29/32 | (2006.01) |
| F01D 7/00 | (2006.01) |
| B64C 11/32 | (2006.01) |
| B64C 11/06 | (2006.01) |
| B64D 27/00 | (2006.01) |

(52) U.S. Cl.
CPC ............ *B64C 11/306* (2013.01); *B64C 11/48* (2013.01); *F02C 6/206* (2013.01); *F04D 29/323* (2013.01); *F01D 7/00* (2013.01); *B64C 11/32* (2013.01); F05D 2260/74 (2013.01); B64D 2027/005 (2013.01); Y02T 50/66 (2013.01); F05D 2250/34 (2013.01); *B64C 11/06* (2013.01); F05D 2260/79 (2013.01)
USPC ...................................... 416/156; 416/168 R

(58) Field of Classification Search
USPC ............... 416/156, 157 A, 167, 168 A, 168 R
See application file for complete search history.

(56) References Cited

U.S. PATENT DOCUMENTS

| | | | |
|---|---|---|---|
| 3,873,236 A | | 3/1975 | Gall |
| 4,021,142 A | * | 5/1977 | Violette ........................ 416/167 |

(Continued)

FOREIGN PATENT DOCUMENTS

| | | |
|---|---|---|
| EP | 0 363 997 | 4/1990 |
| EP | 1 921 325 | 5/2008 |
| FR | 2 551 023 | 3/1985 |

OTHER PUBLICATIONS

International Search Report Issued Jul. 19, 2010 in PCT/FR10/000361 Filed May 11, 2010.

*Primary Examiner* — Edward Look
*Assistant Examiner* — Juan G Flores
(74) *Attorney, Agent, or Firm* — Oblon, Spivak, McClelland, Maier & Neustadt, L.L.P.

(57) ABSTRACT

A turbomachine including at least one unducted propeller with variable pitch blades, the blades being carried by respective plates mounted to pivot in radial housings of a rotor element and connected to a control ring that is driven in rotation about the axis of the turbomachine together with the rotor element, and that is movable in translation along the axis to pivot the plates about their axes, the control ring being centered and guided in rotation about the axis on a mechanism that is stationary in rotation and movable in translation along the axis by an actuator carried by the stator of the turbomachine.

7 Claims, 3 Drawing Sheets

(56) References Cited

U.S. PATENT DOCUMENTS

Figure 1:
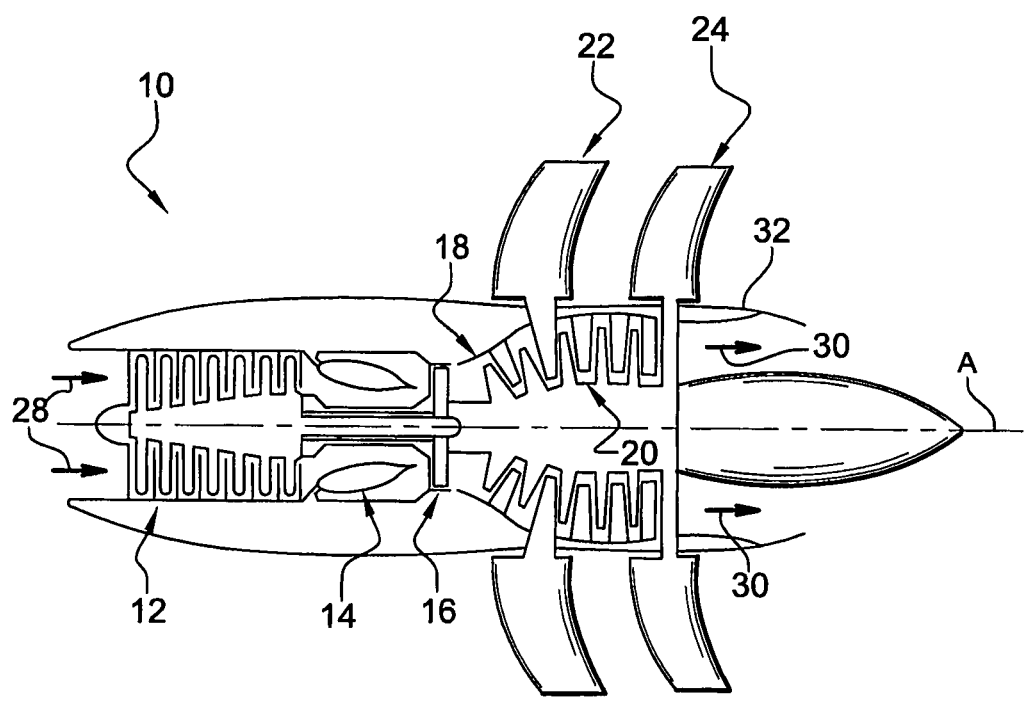

| | | | |
|---|---|---|---|
| 4,124,330 A * | 11/1978 | Barnes | 416/157 B |
| 4,591,313 A | 5/1986 | Miyatake et al. | |
| 4,718,823 A | 1/1988 | Dennison | |
| 5,028,207 A * | 7/1991 | Rohra et al. | 416/129 |
| 5,205,712 A * | 4/1993 | Hamilton | 416/155 |
| 5,431,539 A * | 7/1995 | Carvalho | 416/168 R |
| 2009/0311100 A1 | 12/2009 | Gallet | |
| 2014/0003945 A1* | 1/2014 | Perdrigeon et al. | 416/147 |

* cited by examiner

UNDUCTED PROPELLER WITH VARIABLE PITCH BLADES FOR A TURBOMACHINE

The present invention relates to a turbomachine having at least one unducted propeller with blades of the variable-pitch type.

A turbomachine of the open rotor or unducted fan type has two external contrarotating unducted propellers on a common axis, respectively an upstream propeller and a downstream propeller, each of which is driven in rotation by a turbine of the turbomachine and extends substantially radially outside the nacelle of the turbomachine.

Each propeller includes an annular rotor element having substantially radial housings disposed around the longitudinal axis of the turbomachine with substantially cylindrical plates mounted therein for supporting respective blades of the propeller. The plates are capable of pivoting in the housings of the rotor element and they are driven in pivoting about the blade axes by appropriate means so as to adjust the angular pitch of the blades, in order to optimize the blade pitch as a function of its operating conditions.

In the prior art, the means for pivotally driving the plates comprise actuators that are carried by a rotary portion of the turbomachine, which constitutes a drawback since there is a danger of the actuators not being powered properly. Furthermore, in operation those actuators are subjected to relatively high centrifugal forces that might in particular impede their operation.

Proposals have already been made to control the angular pitch of the blades of a turbomachine propeller by means of a control ring that extends around the axis of the turbomachine and that is connected to the plates via link members, the ring being movable in translation along the axis of the turbomachine in order to drive the plates in pivoting about the axes of the blades. In the prior art, that control ring constitutes a nut and it is mounted on a rotary portion of the turbomachine, which portion forms a wormscrew, with relative rotation between said rotary portion and the ring causing the ring to move in translation along the axis of the turbomachine and thus causing the blade support plates to pivot.

Nevertheless, that solution is not satisfactory either, since the entire mechanism is set into rotation when the turbomachine is in operation. Furthermore, it is relatively complex to make and to use.

A particular object of the invention is to provide a solution to these problems that is simple, effective, and inexpensive.

To this end, the invention proposes a turbomachine including at least one unducted propeller having variable pitch blades, the blades being carried by respective substantially cylindrical plates mounted to pivot about their axes in radial housings of an annular rotor element, and being connected at their radially inner ends to a control ring that is driven in rotation about the axis of the turbomachine together with the rotor element, and that is movable in translation along said axis in order to drive pivoting of the plates about their axes, the turbomachine being characterized in that the control ring is centered and guided in rotation about the axis of the turbomachine on means that are stationary in rotation and movable in translation along said axis by means of an actuator carried by the stator of the turbomachine.

Thus, in the invention, the means for moving the control ring in translation along the axis of the turbomachine are stationary in rotation and they are not subjected to centrifugal forces in operation. Only the control ring and the means linking said ring to the blade support plates move in rotation about the axis of the turbomachine.

According to another characteristic of the invention, the means for centering and guiding the control ring comprise an annular rail extending around the axis of the turbomachine, and rolling means mounted between the rail and the control ring. These rolling means serve to limit wear of the rail and of the means for centering and guiding.

Advantageously, the rail has a substantially U-shaped section and comprises two side walls defining between them an outwardly-open annular groove in which the control ring is engaged, the rolling means being mounted on either side of the control ring between said ring and the side wall.

The rail is preferably made up of two annular parts of common axis that are fastened to each other, a first part defining one of the side walls of the rail, and the second part having a substantially L-shaped section defining both the bottom of the groove and the other side wall of the rail. The two parts of the rail may be fastened to each other by screws regularly distributed around the axis of the turbomachine.

By way of example, the rolling means are constituted by ball bearings. The actuator may be an electric, hydraulic, or pneumatic actuator, for example.

Each means linking the control ring to a blade support plate may comprise a link having one end hinged to an element that is fastened to or formed at the radially inner end of the plate, and having its other end hinged to an element that is itself hinged to a clevis of the control ring about an axis that is parallel to the axis of the turbomachine.

The turbomachine of the invention may be of the type having two contrarotating unducted propellers of the above-mentioned type that share a common axis.

Figure 2:
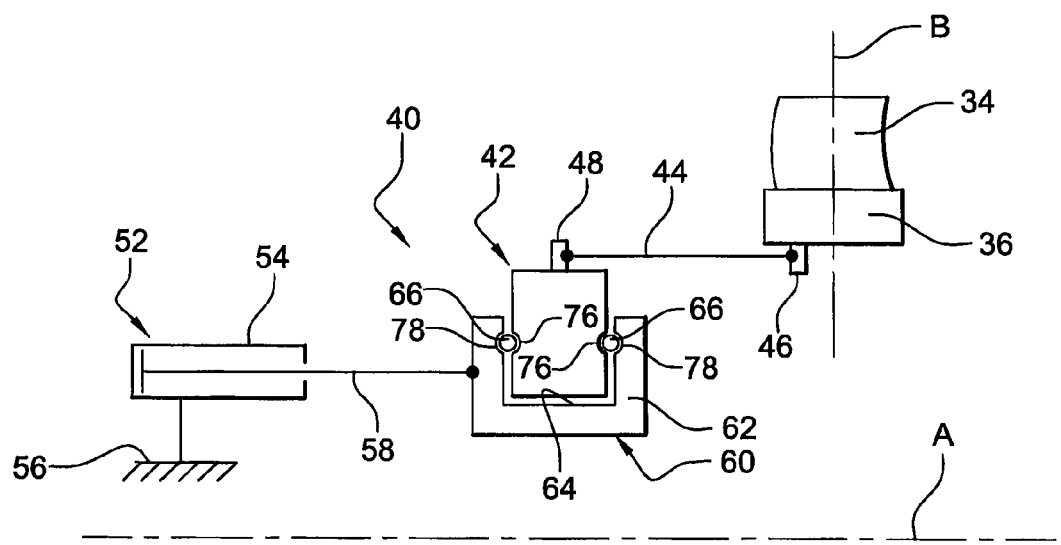
Figure 3:
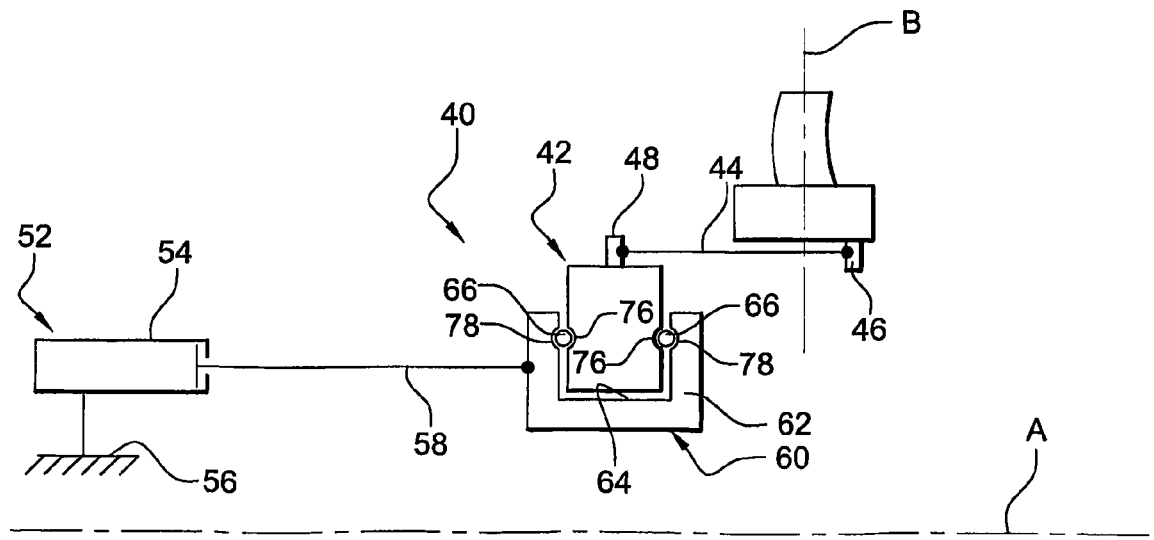
Figure 4:
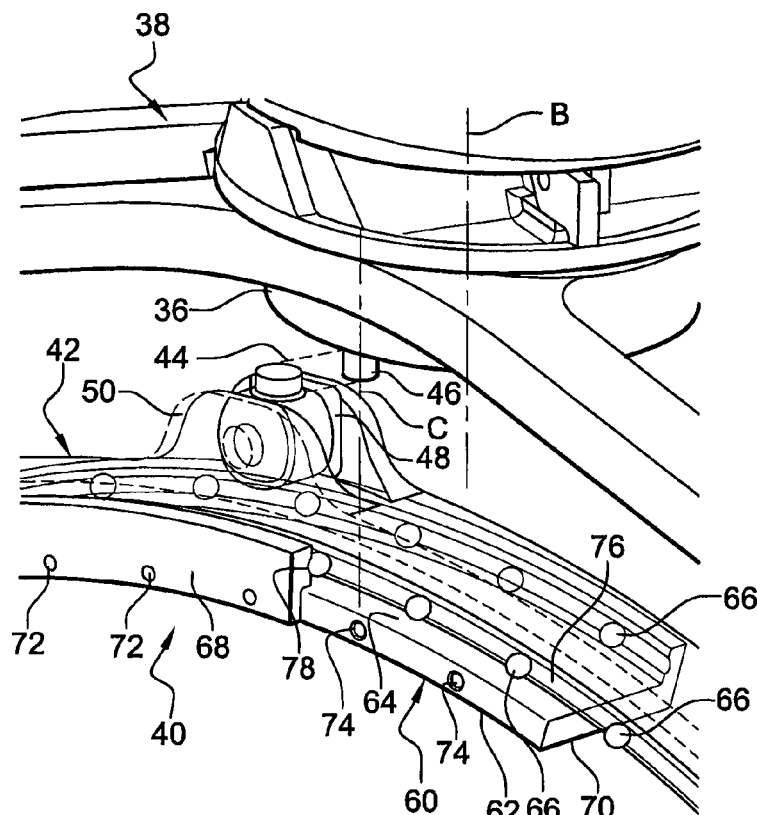
Figure 5:
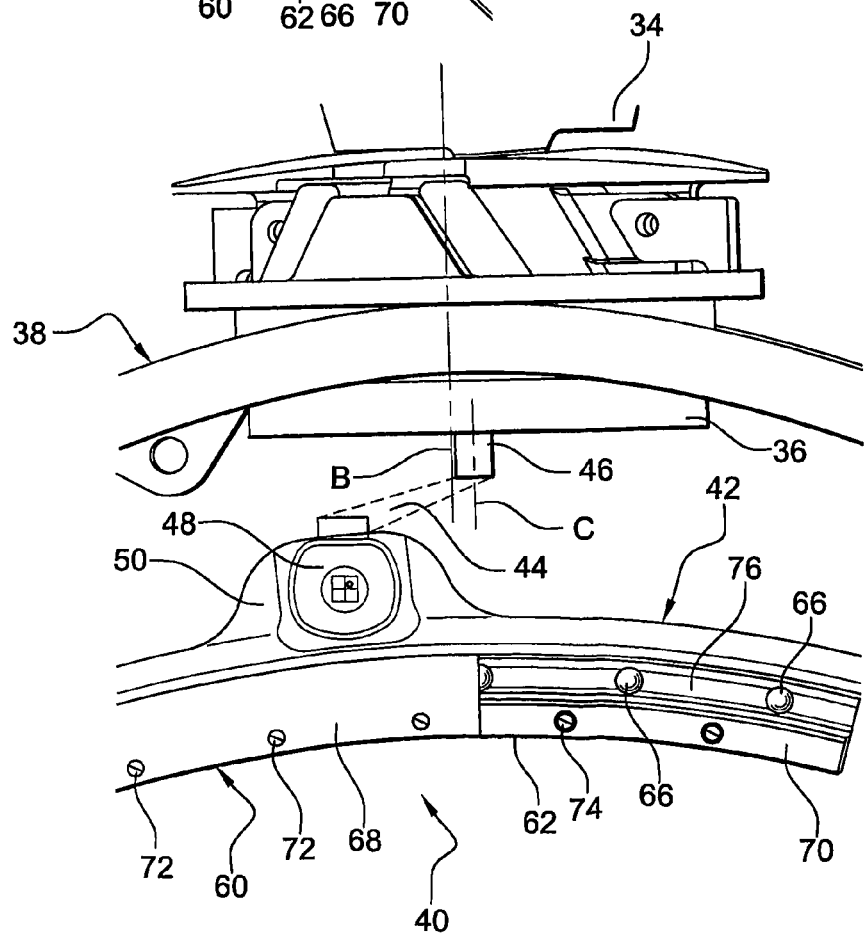

The invention can be better understood and other details, characteristics, and advantages of the present invention appear more clearly on reading the following description made by way of non-limiting example and with reference to the accompanying drawings, in which:

FIG. 1 is a diagrammatic axial section view of a turbomachine having unducted propellers;

FIGS. 2 and 3 are diagrammatic views of the means of the invention for applying pivotal drive to the blade support plates of an unducted propeller of a turbomachine, showing two different angular setting positions for said plates; and FIGS. 4 and 5 are fragmentary perspective diagrammatic views showing an embodiment of the drive means of FIGS. 2 and 3.

Reference is made initially to FIG. 1 which shows a turbomachine 10 having unducted propellers (also known as open rotors or unducted fans) the turbomachine comprising from upstream to downstream in the flow direction of gas inside the turbomachine: a compressor 12; an annular combustion chamber 14; an upstream high-pressure turbine 16; and two downstream low-pressure turbines 18 and 20 that are contrarotating, i.e. turbines that rotate in operation in opposite directions about the longitudinal axis A of the turbomachine.

Each of these downstream turbines 18, 20 is constrained to rotate with an external propeller 22, 24 that extends radially outside the nacelle 26 of the turbomachine, said nacelle 26 being substantially cylindrical and extending along the axis A around the compressor 12, the combustion chamber 14, and the turbines 16, 18, and 20.

The stream of air 28 that penetrates into the compressor 12 is compressed and then mixed with fuel and burnt in the combustion chamber 14, the combustion gas then being injected into the turbines in order to drive the propellers 22 and 24 in rotation, thereby delivering the major fraction of the thrust generated by the turbomachine. The combustion gas leaves the turbines and is finally expelled via a nozzle 32 (arrows 30) in order to increase said thrust.

The propellers 22 and 24 are disposed on a common axis one behind the other. Each of the propellers 22 and 24 has a plurality of blades 34 carried by respective substantially cylindrical plates 36 that are engaged in radial housings of an annular element of the rotor 38, as shown in part in FIGS. 4 and 5. This rotor element 38 extends around the axis A of the turbomachine, and it is connected by suitable means to the rotor of one of the downstream turbines 18, 20 in order to be driven in rotation.

The plates 36 for supporting the blades 34 are mounted to pivot about their own axes in the radial housings of the rotor element 38, and they are connected to pivotal drive means 40 for pivoting said plates so as to adjust the angular pitch of the blades about their respective axes B, thereby optimizing the blade pitch as a function of the operating conditions of the turbomachine.

The means 40 of the invention for pivotally driving the plates 36 for supporting the blades 34 are shown diagrammatically in FIGS. 2 and 3, and in greater detail in FIGS. 4 and 5.

These drive means 40 comprise firstly rotary elements connected to the blade support plates 36 and thus to the rotor element 38, and secondly non-rotary elements connected to the stator of the turbomachine.

The rotary elements of the drive means 40 of the invention comprise a control ring 42 that extends around the axis A of the turbomachine and that is driven in rotation about said axis together with the rotor element 38. This control ring 42 is connected via link-type members to the blade support plates 36.

Each link 44 connecting a plate 36 to the ring 42 has one end hinged on a cylindrical peg 46 extending radially inwards from the radially inner end of the plate, and another end hinged on an element 48 that is itself hinged on a clevis 50 of the ring 42. The hinge axes of the links relative to the plate 36 and the element 48 are parallel and oriented substantially parallel to the axis B of the corresponding plate. The axis C of the cylindrical peg 46 on the plate is parallel to the axis B of said plate and is situated close to the outer periphery of the plate so that the axes B and C are not in alignment with each other. The hinge axis between the element 48 and the clevis of the ring is substantially parallel to the axis A of the turbomachine.

The control ring 42 is movable in translation along the axis A of the turbomachine using the non-rotary elements of the drive means 40 of the invention, comprising an actuator 52 having its cylinder 54 fastened to the stator of the turbomachine and having its rod 58 connected to means 60 for centering and guiding pivoting of the control ring 42 about the axis A, so as to move said means 60 along the axis A.

The actuator 52 may be hydraulic, pneumatic, or electric.

The means 60 for centering and guiding the ring 42 comprise an annular rail 62 that extends around the axis A of the turbomachine and that is moved in translation along said axis by the actuator 52, the rail including an annular groove 64 having rolling means 66 mounted therein for guiding the control ring 42.

In the embodiment of FIGS. 4 and 5, the rail 62 is made up of two annular parts 68 and 70 having a common axis and fastened to each other so as to define between them the above-mentioned groove 64 for housing the ring 42. The first part 68 is substantially plane and radial, and it defines a first side wall of the groove. The second part 70 presents a substantially L-shaped section, and it comprises both a plane portion that defines the other side wall of the groove 64 and a cylindrical portion that defines the bottom of the groove 64, the plane portion being connected at its inner periphery to one end of the cylindrical portion and the free end of the cylindrical portion being fastened to the inner periphery of the first part 68.

This first part 68 includes axial orifices 72 in its inner periphery for passing screws that are in alignment with tapped orifices 74 in the free end of the cylindrical portion of the second part 70. These orifices 72, 74 are regularly distributed around the axis A.

The rolling means 66 in this example are two ball bearings that are mounted on either side of the rail 62 between said rail and the above-mentioned side walls of the rail. The balls in each bearing 66 in this example are guided in annular grooves 76, 78 about a common axis and facing each other, which grooves are formed respectively in the side wall of the rail 62 and in the corresponding side wall of the ring 42.

The drive means 40 of the invention operate as follows. Moving the rod 58 of the actuator 52 along the axis A of the turbomachine causes the rail 62 to move in translation along said axis and thus also causes the control ring 42 that is housed in the annular groove 64 of the rail to move thereal-ong. The movement in translation of the ring 42 acts via the links 44 to cause the plates 36 to pivot about the axes B of the blades 34. In FIG. 1, the rod 58 of the actuator is in its retracted position and the rail 62 and the ring 42 are in the set-back position in which the blades 34 have a certain angular position relative to their respective axes B. In FIG. 2, the rod 58 of the actuator is in its extended position and the rail and the ring are in an advanced position in which the blades are in another angular position relative to their respective axes B. The maximum angular movement of the blades about their axes is about 75° (between −30° and +45°, approximately).

The speed of rotation V of the control ring 42 is of the order of 73 meters per second (m/s) in one particular embodiment (V=ω·R, ω=1000 revolutions per minute (rpm) or 104 radians per second (rad/s), and R=726 millimeters (mm)). This speed is much slower than the speed of a rotary element of a high pressure spool of the turbomachine, which is V'=102 m/s in a particular embodiment (ω=16,000 rpm or 1674 rad/s, and R=61 mm).

The invention claimed is:

1. A turbomachine comprising:
at least one unducted propeller of variable pitch blades, the blades being carried by substantially cylindrical plates mounted to pivot about their respective axes in radial housings of an annular rotor element and connected via their radially inner ends to a control ring that is driven in rotation about the axis of the turbomachine together with a rotor element, and that is movable in translation along the axis to cause the plates to pivot about their respective axes, the control ring being centered and guided in rotation about the axis of the turbomachine on means for centering and guiding the control ring that is stationary in rotation and movable in translation along the axis by an actuator carried by a stator of the turbomachine,
wherein the means for centering and guiding the control ring comprises an annular rail of substantially U-shaped section that extends around the axis of the turbomachine and that comprises two side walls that define between them an annular groove that is outwardly open, and in which the control ring is engaged, and further comprising rolling means being mounted on either side of the control ring between the ring and the side walls of the rail.

2. A turbomachine according to claim 1, wherein the rail includes two annular parts of common axis that are fastened to each other, a first part defining one of the side walls of the rail, and a second part having a substantially L-shaped section defining both a bottom of the groove and the other side wall of the rail.

3. A turbomachine according to claim 2, wherein the two parts of the rail are fastened to each other by screws regularly distributed around the axis of the turbomachine.

4. A turbomachine according to claim 1, wherein the rolling means includes ball bearings.

5. A turbomachine according to claim 1, wherein the actuator is an electric, hydraulic, or pneumatic actuator.

6. A turbomachine according to claim 1, wherein the control ring is connected to the plates for supporting the blades by links each having one end hinged to an element that is fastened to or formed on the radially inner end of the plate, and another end hinged to an element that is itself hinged to a clevis of the control ring about an axis that is parallel to the axis of the turbomachine.

7. A turbomachine according to claim 1, comprising two contrarotating unducted propellers that share a common axis.

\* \* \* \* \*